J. GRANER.
Revolving Cultivator.
No. 198,540. Patented Dec. 25, 1877.
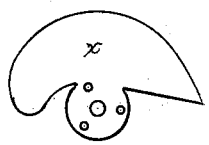
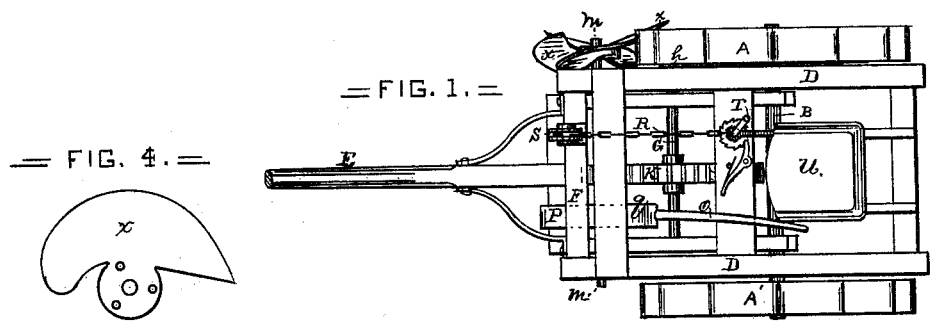
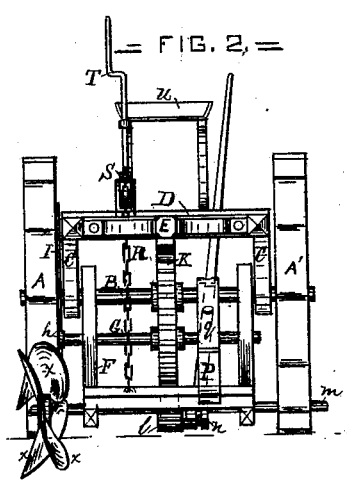
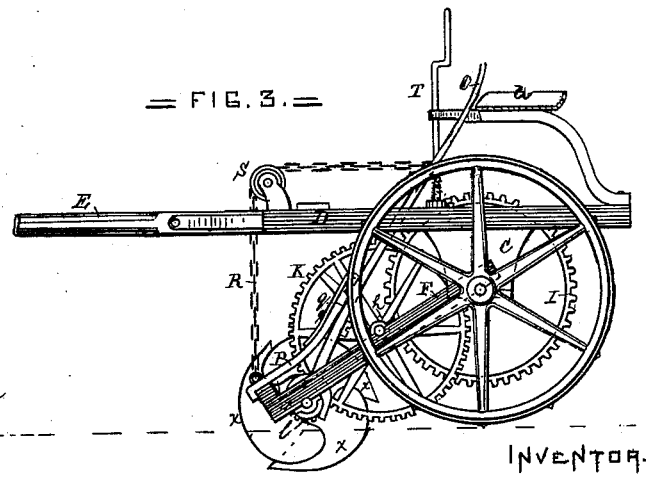
Witnesses.
INVENTOR.
John Graner
By H. N. Jenkins
ATTORNEY

UNITED STATES PATENT OFFICE.

JOHN GRANER, OF NEW ORLEANS, LOUISIANA.

IMPROVEMENT IN REVOLVING CULTIVATORS.

Specification forming part of Letters Patent No. 198,540, dated December 25, 1877; application filed August 20, 1877.

*To all whom it may concern:*

Be it known that I, JOHN GRANER, a resident of the city of New Orleans, parish of Orleans, and State of Louisiana, have invented a certain new and useful Improvement in Revolving Plows or Cultivators; and I do hereby declare the following to be a full, clear, and correct description of the same, reference being had to the annexed drawings, making a part of this specification.

My invention relates to the production of an implement for economically and effectually plowing the soil, for throwing earth either to or from the roots of young plants, and for cutting up pea-vines, &c.

On the accompanying drawings, Figure 1 represents a plan or top view, Fig. 2 a front elevation, and Fig. 3 a side elevation, of the implement. Fig. 4 represents one of the blades of my revolving plows or scrapers.

The implement is mounted on a pair of ground-wheels, A A', that operate on the ends of the shaft or axle B, in which are journals for the reception of the bearings C C' of the main frame D. The latter is furnished with a draft-bar, E, which may be attached to either end of the machine, as the nature of the work may require.

F is an open frame, the rear of which is connected with the axle by means of journal-bearings, so that its forward end may be raised or lowered whenever necessary so to do. About the center of this frame, and operating in journal-boxes constructed in the sides thereof, is a shaft, G, on one of the ends of which is rigidly keyed a pinion, $h$, that gears in a cog-wheel, I, which is keyed on the axle B, so as to operate between the main frame and wheel, as shown.

The shaft G is furnished midway between its bearings with a cog-wheel, $k$, which engages a pinion, $l$, that is loosely fitted on a shaft, $m$, the latter having bearing near the outer ends of the side pieces of the open frame. The pinion $l$ is engaged, when necessary for the operation of its shaft, by a sliding coupling, $n$, the lever O of which is pivoted to a support, P, on which is secured a spring, $q$, for holding the said lever in a given position.

The shaft $m$ is made long enough to project on each side of the frame, and on one or both of its projecting ends is securely fitted my improved rotary plows or scrapers, which consist of three blades, $x$ like that shown in Fig. 4, which are bolted together, and secured to a center that is keyed or otherwise secured to the shaft.

The forward end of the open frame is suspended by a chain, R, which runs over a pulley, S, and has its rear end secured to a vertical crank-rod, T, the lower end of which operates in a step, while its upper portion is steadied by a brace that projects forward from the driver's seat U. The lower end of the above-mentioned rod is provided with a ratchet-wheel, which is engaged by a pawl, (not necessarily shown,) for preventing its turning backward except by design.

As previously indicated, the draft-bar may be transferred to the opposite end of the machine. This will only be necessary, however, when cutting pea-vines, &c., in which event it will also be necessary to reverse the cutters, so as to have the backs of the blades strike before their points.

The advantage in placing the cutter in the rear is, that the vines are well rolled and pressed closely against the earth by the wheels of the machine, which thereby facilitates operation of the cutters.

Having described my invention, what I claim as new, and desire to secure by Letters Patent, is—

1. The frame D, having tongue E, arranged to be attached to either end of the machine, and the axle B, having bearing-wheels A and gear-wheel I, in combination with the hinged frame F, shafts G $m$, gear-wheels $h$ $k$ $l$, chain R, and crank-shaft T, substantially as described.

2. The blades $x$, of the shape described, attached to the shaft $m$ in propeller form, and arranged to revolve in the direction of the line of draft, and made reversible to allow their points or opposite ends to enter the ground first, substantially as described.

In testimony whereof I have hereunto signed my name.

JOHN GRANER.

In presence of—
ALFRED W. J. MASON,
J. N. MÜLLER.